United States Patent Office 3,281,479
Patented Oct. 25, 1966

3,281,479
PROCESS FOR THE SYNTHESIS OF
TERPENE ALCOHOL
Morimasa Arakawa, Osaka, Yoshimitsu Nakamura, Hirakata, and Yasuo Uemura and Takao Omori, Osaka, Japan, assignors to Arakawa Rinsan Kagaku Kogyo Kabushiki Kaisha, Osaka, Japan, a corporation of Japan
No Drawing. Filed July 17, 1963, Ser. No. 295,826
8 Claims. (Cl. 260—631.5)

This invention relates to a process for the synthesis of terpene alcohol.

Hitherto many processes for synthesizing terpene alcohol from hydrocarbons of terpene series such as α-pinene have already been published. For example, (1) a direct synthesis of α-terpineol in which an appropriate catalyst such as boron trifluoride-acetic acid complex is caused to react with α-pinene, (2) an indirect synthesis of α-terpineol in which at first terpin hydrate is synthesized by reaction of sulfuric acid catalyst on α-pinene and then said terpin hydrate is subjected to dehydration with a dehydration catalyst, in addition (3) hydrolysis of acetate (for example synthesis of isoborneol), (4) hydration, (5) addition of formaldehyde, (6) process using Ziegler catalyst, (7) epoxidation of α-pinene followed by hydration or decomposition, (8) reduction of hydroperoxide by autoxidation, (9) process by means of chlorination and the like have been published. In these, the indirect process (2) is only usually carried out industrially. That is to say, terpin hydrate, for example is at first synthesized by making acid catalyst such as sulfuric acid to react with α-pinene and then is dehydrated with an appropriate acid catalyst to give α-terpineol. There are many inventions relating to this process. In view of the purity of α-terpineol (the content of alcohol) the yield of α-terpineol is only about 50–60% from α-pinene. Further, according to said process α-terpineol is obtained from α-pinene through terpin hydrate so that the reaction is two-step one and is not industrially advantageous.

Recently, progressive studies on boron trifluoride is accompanied by an improved use thereof. In particular, it has been found that when α-pinene is subjected to the reaction with boron trifluoride-acetic acid complex α-terpineol may be directly produced with the yield of about 50%. On our estimation that the direct synthesis of α-terpineol in which α-pinene is made to react with boron trifluoride-acetic acid complex is very industrially advantageous, we have studied on this synthesis to improve it. That is to say, we have investigated with respect to a co-catalyst and also systematically studied on the concentration of acidic medium (acetic acid, formic acid, propionic acid and the like) which is adaptable for said co-catalyst and reaction condition. As the result of our study we have found a very advantageous direct synthesis of terpene alcohol. Basing on this discovery we have carried out the direct synthesis of terpene alcohol, using boron trifluoride-acetic acid complex on α-pinene-acetic acid or α-pinene-formic acid and at the same time changing the range of the acid concentration from 10% to 90% at the reaction temperature of 65–70° C. From these examinations we have found that in the case of acetic acid the concentration of 30–50% and in the case of formic acid the concentration of 30% are respectively optimum reaction conditions and the yield of alcohol is 50%. In each case, the reaction was not influenced by the reaction times of 3–6 hours. According to our investigation, there may be mentioned, as the very useful co-catalysts, the following compounds: oxides of metal belonging to Groups II, IV and VI in the Periodic Table and salts of said metals with organic or inorganic acids, for example, inorganic or organic acid salts, oxides of mercury such as mercuric oxide, mercuric sulfate, mercuric chromate, mercuric carbonate, mercuric nitrate, mercuric phosphate, mercuric oxalate, mercuric acetate; inorganic or organic acid salts, oxides of lead such as lead oxide, lead sulfate, lead carbonate, lead chromate, lead nitrate, lead phosphate, lead oxalate, lead formate, lead acetate; inorganic or organic acid salts, oxides of chromium such as chromic trioxide, chromic sulfate, chromic phosphate, chromic nitrate, chromic carbonate, chromic hydroxide, chromic acetate, chromic oxalate. We have found that due to the addition of these co-catalysts, the highest yield of terpene alcohol against α-pinene is amounted to 66.5%, that is, the increased yield of 16–11% more than that in the known process is resulted. We have also found that in addition to aforementioned metallic compounds, sulfuric acid, and activated carbon can be used as very effective co-catalysts. The amount of these co-catalysts to be used is sufficient in an amount less than 10% by weight of α-pinene.

We have also found that the yield of the alcohol can be further elevated by several percentages if the aqueous acetic acid is recovered from the reaction mixture after the completion of the reaction and then recycled for re-use.

The representative experimental examples will be tabled as follows:

| Number of Experiment | Concentration of organic acid (percent) | Boron trifluoride acetic acid complex (g.) | Co-catalysts and amount (g.) |
|---|---|---|---|
| 1 | 50% acetic acid | 52% (10) | Activated carbon, 1. |
| 2 | ____do____ | 52% (10) | Mercuric acetate, 1. |
| 3 | ____do____ | 52% (10) | Mercuric oxide, 1. |
| 4 | ____do____ | 52% (10) | Mercuric sulfate, 1. |
| 5 | ____do____ | 52% (10) | Mercuric chromate, 0.5. |
| 6 | ____do____ | 52% (10) | Sulfuric acid, 1. |
| 7 | ____do____ | 52% (10) | Lead mono-oxide, 1. |
| 8 | ____do____ | 52% (10) | Lead acetate, 1. |
| 9 | ____do____ | 52% (10) | Lead sulfate, 1. |
| 10 | ____do____ | 52% (10) | Chromic trioxide, 1. |
| 11 | ____do____ | 52% (10) | Chromic acetate, 1. |
| 12 | 30% formic acid | 52% (10) | Mercuric oxide, 1. |
| 13 | ____do____ | 52% (10) | Lead formate, 1. |
| 14 | 50% acetic acid | 52% (10) | None. |

PROPERTIES OF REACTION PRODUCTS

| Yield (g.) | $n_D^{20}$ | $D^{15}$ | Alcohol (percent) | Yield of Whole Alcohols (percent) |
|---|---|---|---|---|
| 77 | 1.477 | 0.919 | 83.5 | 64.5 |
| 80 | 1.478 | 0.918 | 83.0 | 66.5 |
| 84.5 | 1.477 | 0.924 | 79.8 | 67.4 |
| 84 | 1.477 | 0.920 | 80.5 | 64.4 |
| 83 | 1.478 | 0.916 | 75.2 | 62.4 |
| 87.5 | 1.476 | 0.918 | 75.7 | 66.0 |
| 74.5 | 1.479 | 0.928 | 83.0 | 61.5 |
| 80 | 1.477 | 0.926 | 78.0 | 62.4 |
| 86 | 1.478 | 0.926 | 75.0 | 64.5 |
| 85 | 1.477 | 0.922 | 75.4 | 64.0 |
| 81 | 1.477 | 0.920 | 80.0 | 64.8 |
| 78 | 1.476 | 0.912 | 65.8 | 51.3 |
| 80 | 1.477 | 0.916 | 72.1 | 56.6 |
| 81 | 1.478 | 0.915 | 61.3 | 49.7 |

The experiments have been carried out, using 100 g. of organic acid of given concentration against 100 g. of α-pinene, at 65–70° C. for 6 hours under strong stirring. In the above experiments boron trifluoride-acetic acid complex of 52% concentration of boron trifluoride ($BF_3$) is used but this concentration has no necessity to be limited and it is only sufficient to control the amount of boron-trifluoride ($BF_3$).

Furthermore, a series of experiments is carried out using, as the starting α-pinene, sulfate pinene which has been produced in United States of America, employing a constant quantity, i.e., 14.5 gr. of boron trifluoride-acetic acid complex (36% BF$_3$) as the catalyst and varying the concentration of acetic acid within a range of 20–70% with re-use of the aqueous acetic acid recovered. This is to examine how the total yield of the alcohol is influenced on by the repeated use of the aqueous acetic acid recovered. The results of the series of experiments are shown in the following table.

thus treated is subjected to a distillation under a reduced pressure 3 mm. Hg to recover terpene alcohol fraction. Yield 85 gr. The content of terpene alcohol in the oil is 83%. The yield of total alcohol is 66.5% (against α-pinene). $n_D^{20}$ and $_D^{15}$ of the product are respectively 1.478 and 0.918. The acid layer recovered is amount to 74 gr. which can be used repeatedly in the reaction.

| Number of Experiment | Concentration of acetic acid (percent) | Amounts of boron trifluoride-acetic acid complex (g.) | Co-catalyst and amount (g.) | Yield (g.) | $n_D^{20}$ | $_D^{15}$ | Content of the alcohol (percent) | Total yield of the alcoho (percent) |
|---|---|---|---|---|---|---|---|---|
| 15 | 20 | 14.5 | 1 g. of chromic trioxide | 78.5 | 1.4753 | 0.9035 | 55.1 | 42.3 |
| 16 | 30 | 14.5 | do | 84.1 | 1.4776 | 0.914 | 68.3 | 57.4 |
| 17 | 40 | 14.5 | do | 89.2 | 1.4780 | 0.9175 | 71.4 | 63.7 |
| 18 | 50 | 14.5 | do | 83.2 | 1.4791 | 0.9118 | 63.0 | 52.5 |
| 19 | 60 | 14.5 | do | 87.2 | 1.4773 | 0.903 | 47.3 | 41.3 |
| 20 | 70 | 14.5 | do | 73.3 | 1.4782 | 0.9283 | 28.7 | 21.0 |
| 21 | 30 | 14.5 | do | 91.6 | 1.4763 | 0.9065 | 59.7 | 54.8 |
| 22 | 50 | 14.5 | do | 85.4 | 1.4785 | 0.9135 | 64.9 | 55.4 |
| 23* | 40 | 14.5 | do | 94.6 | 1.4778 | 0.9169 | 73.0 | 69.1 |
| 24** | 40 | 14.5 | do | 96.0 | 1.4780 | 0.910 | 69.1 | 66.3 |

From the above table it is clear that the total yield of the alcohol is a maximum of 63.7% when the concentration of the aqueous acetic acid is 40% under the above-mentioned reaction conditions and that the concentration of the aqueous acetic acid of either higher or lower than 40% gives a reduction in the total yield of the alcohol. In both the experiments numbered 23* and 24**, there are re-used the aqueous acetic acids which has been recovered from the experiment Nos. 17 and 23, respectively. Re-use of the aqueous acetic acid recovered gives an increase in the total yield of the alcohol, so that the possibility to re-use the aqueous acetic acid recovered may be proved.

A further series of experiments is carried out by using the sulfate pinene produced in United States of America as the starting α-pinene, employing an aqueous solution of 40% of acetic acid in the same amount as the quantity of the α-pinene used and varying the quantity of the catalyst. This is to check how the total yield of the alcohol is influenced on by the variation in the quantity of the catalyst used. The results of the experiments are shown in the following table.

On the process for the production of terpene alcohol from α-pinene in the presence of acid such as formic acid, acetic acid, propionic acid, using boron trifluoride-acetic acid complex as a catalyst, in a case of acetic acid, for example, 30–50% concentration and in a case of formic acid 30% concentration are the most suitable concentration respectively. In particular, the concentration of 40% of acetic acid is most suitable when the starting material used is the sulfate pinene which has been produced in United States of America. If the concentration of acid will be raised, a polymer such as dimer of α-pinene is formed. On the contrary, at lower concentration the reaction is retarded. It is most appropriate to use the catalyst in such a quantity that the boron trifluoride content of the catalyst amounts to about 5% by weight of the starting α-pinene.

What is claimed is:
1. A process for the synthesis of terpene alcohol from α-pinene by a one step reaction which comprises treating α-pinene with an aqueous solution of an acid selected from the group consisting of formic, acetic and propionic acid, using as a catalyst boron trifluoride-acetic acid com-

| Number of Experiments | Amount (g.) of boron trifluoride-acetic acid complex (36% BF$_3$) | Co-catalyst and its amount (g.) | Yield (g.) | $n_D^{20}$ | $_D^{15}$ | Content of the alcohol (percent) | Total yield of the alcohol (percent) |
|---|---|---|---|---|---|---|---|
| 25 | 8.4 | 1 g. of chromic trioxide | 87.5 | 1.4734 | 0.8975 | 45.5 | 39.8 |
| 26 | 19.4 | do | 88.6 | 1.4793 | 0.9138 | 62.6 | 55.4 |
| 27 | 14.5 | do | 89.2 | 1.4780 | 0.9175 | 71.4 | 63.7 |

From the above table it is clear that when the quantity of the catalyst consisting of boron trifluoride-acetic acid complex (36% BF$_3$) is 14.5 g., the total yield of the alcohol is a maximum and the reaction conditions are optimum.

*Example*

100 gr. of α-pinene and 100 gr. of 50% acetic acid are put in a three-neck flask with a stirrer, a thermometer and a reflux condenser. In said flask 10 gr. of boron trifluoride-acetic acid complex (BF$_3$ 52% concentration) as a catalyst and 1 gr. of mercuric acetate as a co-catalyst are added. The mixture are caused to react for 6 hours at the temperature of 65–70° C. After the reaction, oil phase is separated from acid layer and washed with 100 cc. of saturated saline solution and then with 100 cc. of 1% aqueous solution of sodium bicarbonate. After further washing with saturated saline solution, said oil phase is washed with water and dried on a dehydrating sodium sulfate. The oil attached to said salt is removed by ether and mixed with the oil layer. The oil phase plex and as a co-catalyst at least one of the substances selected from the group consisting of oxides, sulfates, nitrates, acetates, formates and oxalates of mercury, lead and chromium.

2. A process for the synthesis of terpene alcohol from α-pinene by a one step reaction which comprises treating α-pinene in an aqueous solution of an acid selected from the group consisting of formic, acetic and propionic acid, using as a catalyst boron trifluoride-acetic acid complex and as a co-catalyst one of the compounds selected from the group consisting of mercuric acetate, mercuric oxide and chromic trioxide.

3. A process as claimed in claim 1 in which the concentration of said aqueous solution of the acid is 30 to 50%.

4. A process for the synthesis of terpene alcohol from α-pinene by a one step reaction which comprises treating α-pinene at 50 to 80° C. for 1 to 10 hours in a medium comprising 30 to 50% of an aqueous solution of an acid selected from the group consisting of formic, acetic and propionic acid, said solution containing as a catalyst, boron trifluoride-acetic acid complex in an amount such that the percent by weight of boron trifluoride is 4 to 7% based on the weight of the α-pinene, the solution further containing as a co-catalyst, one of the compounds selected from the group consisting of mercuric acetate, mercuric oxide and chromic trioxide in an amount of 10 to 30% by weight based on the weight of boron trifluoride.

5. A process for the synthesis of terpene alcohol from α-pinene by a one step reaction which comprises treating the turpentine product of a sulfate pulping process in paper production at 50 to 80° C. for 1 to 10 hours in a 35 to 45% aqueous acetic acid solution in the presence of a boron trifluoride-acetic acid complex as a catalyst and one of the compounds selected from the group consisting of mercuric acetate, mercuric oxide and chromic trioxide as a co-catalyst, said catalyst being present in an amount such that the weight percent of boron trifluoride is 4 to 7% based on the weight of said turpentine, said co-catalyst being present in an amount such that the weight percentage thereof is 10 to 30% based on the weight of boron trifluoride.

6. A process for the synthesis of terpene alcohol from α-pinene by a one step reaction which comprises treating turpentine obtained from oleoresin of the Japanese pine tree at 50 to 80° C. for 1 to 10 hours in a 40 to 50% aqueous acetic acid solution in the presence of a boron trifluoride-acetic acid complex as a catalyst and one of the compounds selected from the group consisting of mercuric acetate, mercuric oxide and chromic trioxide as a co-catalyst, said catalyst being present in an amount such that the weight percent of boron trifluoride is 4 to 7% based on the weight of said turpentine, said co-catalyst being present in an amount such that the weight percentage thereof is 10 to 30% based on the weight of boron trifluoride.

7. A process as claimed in claim 1 in which an aqueous layer of the reaction solution obtained from the treatment of α-pinene is employed in the treatment of fresh α-pinene, together with the catalyst and co-catalyst.

8. A process as claimed in claim 2 in which an aqueous layer of the reaction solution obtained from the treatment of α-pinene is used for the treatment of fresh α-pinene for 1 to 10 hours at 50 to 80° C., together with the catalyst and co-catalyst.

References Cited by the Examiner
UNITED STATES PATENTS

| | | | |
|---|---|---|---|
| 1,593,030 | 7/1926 | Palmer | 260—631.5 X |
| 1,766,369 | 6/1930 | Bassett | 260—631.5 |
| 2,178,349 | 10/1939 | Sheffield | 260—631.5 |
| 2,467,330 | 4/1949 | Milas | 260—631.5 |

LEON ZITVER, *Primary Examiner.*

D. P. CLARKE, T. G. DILLAHUNTY,
*Assistant Examiners.*